United States Patent
Sommer et al.

(10) Patent No.: US 10,400,143 B2
(45) Date of Patent: Sep. 3, 2019

(54) AQUEOUS ADHESIVE COMPOSITION

(71) Applicant: HENKEL AG & CO. KGAA, Duesseldorf (DE)

(72) Inventors: Oliver Sommer, Duesseldorf (DE); Sebastian Kotthoff, Porta Westfalica (DE); Victor Dario Buj Vilalta, Neuss (DE); Ethel Abrahams-Meyer, Viersen (DE)

(73) Assignee: Henkel AG & Co. KGaA, Duesseldorf (DE)

(*) Notice: Subject to any disclaimer, the term of this patent is extended or adjusted under 35 U.S.C. 154(b) by 0 days.

(21) Appl. No.: 15/176,748

(22) Filed: Jun. 8, 2016

(65) Prior Publication Data

US 2016/0280973 A1 Sep. 29, 2016

Related U.S. Application Data

(63) Continuation of application No. PCT/EP2014/076948, filed on Dec. 9, 2014.

(30) Foreign Application Priority Data

Dec. 9, 2013 (DE) .................... 10 2013 225 275

(51) Int. Cl.
| | | |
|---|---|---|
| C09J 133/12 | (2006.01) | |
| C09J 4/06 | (2006.01) | |
| C09J 133/08 | (2006.01) | |
| C08L 31/04 | (2006.01) | |

(52) U.S. Cl.
CPC ............. *C09J 133/12* (2013.01); *C08L 31/04* (2013.01); *C09J 4/06* (2013.01); *C09J 133/08* (2013.01)

(58) Field of Classification Search
CPC .......... C09J 133/12; C09J 4/06; C09J 133/08; C08L 31/04; C08F 2220/1825; C08F 220/14; C08F 220/06; C08F 216/125; C08F 218/08; C08J 133/12
USPC ................................................ 524/303, 503
See application file for complete search history.

(56) References Cited

U.S. PATENT DOCUMENTS

| | | | | |
|---|---|---|---|---|
| 2006/0020079 A1* | 1/2006 | Lorenzo | ................ | C08F 220/18 524/556 |
| 2010/0029846 A1* | 2/2010 | Shibutani | .................. | C08F 2/30 524/801 |

FOREIGN PATENT DOCUMENTS

| | | |
|---|---|---|
| DE | 10253045 A1 | 6/2004 |
| DE | 10316079 A1 | 11/2004 |
| EP | 1672045 A2 | 6/2006 |
| EP | 2033991 A1 | 3/2009 |
| EP | 2284238 A1 | 2/2011 |
| JP | 8-3530 A | 1/1996 |
| JP | H08-003530 A | 1/1996 |
| RU | 2087510 C1 | 8/1997 |
| RU | 2453572 C2 | 6/2012 |
| RU | 2458955 C2 | 8/2012 |
| WO | 2011128400 A1 | 10/2011 |

OTHER PUBLICATIONS

Selvol™ Polyvinyl Alcohol 504, datasheet, Sekisui [retrieved on Feb. 26, 2018]. Retrieved from the Internet <URL:http://www.sekisui-sc.com/wp-content/uploads/SelvolPVOH504_ProductSpec.pdf>. (Year: 2012).*

Selvol™ Polyvinyl Alcohol 523, datasheet, Sekisui [retrieved on Feb. 26, 2018]. Retrieved from the Internet <URL: http://www.sekisui-sc.com/wp-content/uploads/SelvolPVOH523_ProductSpec.pdf>. (Year: 2012).*

Zhang Junying et al., Beijing: Chemical Industry Press, Apr. 30, 2006, pp. 1-6. Applicants provide partial translation of Office Action dated Jan. 24, 2018, citing above-mentioned non patent literature enclosed.

* cited by examiner

*Primary Examiner* — Josephine L Chang

(74) *Attorney, Agent, or Firm* — Sun Hee Lehmann

(57) ABSTRACT

The present invention relates to aqueous adhesive dispersions based on (meth)acrylate which contain as the stabilizer a partially or completely hydrolyzed copolymer of at least one vinyl ester monomer, preferably vinyl acetate, and at least one alkene diester monomer, preferably, 3,4-diacetoxy-1-butene, and to the use of said compositions as labeling adhesives or sealing adhesives.

5 Claims, No Drawings

AQUEOUS ADHESIVE COMPOSITION

FIELD OF THE INVENTION

The present application relates to aqueous adhesive dispersions based on (meth)acrylate which contain, as a stabilizer, a partially or completely hydrolyzed copolymer of at least one vinyl ester, preferably vinyl acetate, together with at least one alkene diester, preferably 3,4-diacetoxy-1-butene, and to the use of such compositions as labeling adhesives and sealing adhesives.

BACKGROUND OF THE INVENTION

Water-based adhesives are known in the prior art as labeling adhesives. Conventionally, such adhesives are applied to one side of a paper or plastics label, and this label is then bonded to a receptacle in a high-speed labeling process. For ease of processing, the receptacles, usually bottles, are already filled with contents when the label is affixed. Since the contents are refrigerated in many cases, the receptacles have an outer surface of which the temperature is below the ambient temperature, and this leads to condensed water forming on the outside of the receptacle. This condensed water is particularly problematic in the high-speed labeling processes that are used nowadays, since the labels do not adhere well to such wet surfaces and therefore easily slip out of position. A general aim is therefore to develop adhesives which also have good adhesive properties on wet surfaces.

A further requirement is that the labels can be easily removed without residue when the receptacles are recycled. For this purpose, it is desirable for the dried adhesive to be able to be dissolved quickly and easily in water or alkaline solutions.

In order to achieve good adhesion of a label to cold bottles wetted with condensed water, casein-based adhesives are predominantly used. However, as a natural product, casein is costly, not always available and is subject to significant fluctuations in quality. However, the advantageous properties of casein-based adhesives are currently still not completely reproduced by synthetic adhesives.

Suitable sealing adhesives play an important role in the field of packaging, cold-sealing adhesives being used to package temperature-sensitive goods, for example foods such as ice cream or chocolate. Heat-sealing adhesives are often used when producing blister packaging for pharmaceuticals. In the process, solvent-based systems are frequently used, since they have good sealing properties, bonding and resistance to many filling substances and environmental influences. However, this is disadvantageous in that working with substances containing high levels of solvent requires special protective measures. Therefore, production workers have to be protected against solvent vapors by appropriate measures, such as extraction systems, and complex explosion protection and fire protection have to be provided in the production department. There is therefore also demand for suitable water-based adhesives, which in particular have good sealing properties.

The problem addressed by the present invention is therefore to provide a synthetic adhesive which has the property of achieving good adhesion to cold and wet bottles and which therefore can replace the casein-based adhesives that are commonly used. Furthermore, the adhesive is intended to be able to be used as a sealing adhesive, in particular a cold-sealing adhesive.

Surprisingly, it has been demonstrated that this can be achieved by adhesive compositions which contain a combination of acrylate polymerizates with special polyvinyl-alcohol-based protective colloids. Commercially available polyvinyl alcohol is not suitable for use in the polymerization of acrylate dispersions due to its special chemical composition.

BRIEF DESCRIPTION OF THE INVENTION

The present invention therefore relates to adhesive compositions which contain a polymer dispersion based on acrylate monomers which are stabilized by polyvinyl alcohol derivatives. Using this specific combination of acrylates and polyvinyl alcohol derivatives, adhesive properties similar to a casein-based recipe can be achieved, without including the negative properties of casein. In particular, by omitting casein, the costs can be significantly reduced and consistent quality can be ensured. These new types of adhesive compositions are also more storage-stable and easier to handle than the known casein adhesives. Compared with known synthetic acrylate adhesives, the compositions according to the invention have improved adherence to cold and wet surfaces, i.e. the label is prevented from slipping out of position and the label can still be washed off very easily even after iced-water storage. In addition, excellent hot-sealing and cold-sealing properties can be achieved. Therefore, the adhesive compositions have high water resistance and are resistant to a wide range of filling substances, such as ketchup, yoghurt, ice cream or chocolate.

In a first aspect, the present invention is therefore directed to an adhesive composition, wherein the adhesive composition is an aqueous (meth)acrylate dispersion which contains, in each case based on the total weight of the adhesive composition:
  a) 15.0 to 55.0 wt. %, preferably 15.0 to 40.0 wt. %, more preferably 16.0 to 25.0 wt. %, of a polymerizate based on (meth)acrylate monomers; and
  b) 0.1 to 5.0 wt. %, preferably 0.4 to 2.5 wt. % of a stabilizer, the stabilizer containing a copolymer of at least one vinyl ester, preferably vinyl acetate, comprising at least one alkene diester of the formula

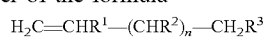

wherein at least two of $R^1$, $R^2$ and $R^3$ are $-OC(O)R^4$ and the remainder are hydrogen, $R^4$ is $C_{1-6}$ alkyl, preferably methyl, and n is 0, 1, 2, 3, 4 or 5, the copolymer being partially or completely hydrolyzed.

"At least one", as used herein, refers to one or more, for example 1, 2, 3, 4, 5, 6, 7, 8, 9 or more.

In a further aspect, the present invention relates to the use of such an adhesive as a labeling adhesive.

By using the adhesive described herein, labels can be very well adhered even to wet and cold glass and plastics surfaces. The adhesive effect is in particular also very good at low temperatures (iced water). Despite the high adhesive strength, the adhesives can be easily washed off.

In a further aspect, the present invention relates to the use of such an adhesive as a sealing adhesive, in particular as a cold-sealing adhesive.

DETAILED DESCRIPTION OF THE INVENTION

The adhesive compositions described herein are water-based dispersions of acrylate-based polymerizates, which are stabilized by specific polyvinyl alcohol derivatives.

The polyvinyl alcohol derivatives used as a protective colloids or stabilizers are copolymers of at least one vinyl ester monomer, preferably vinyl acetate, having at least one alkene diester monomer of the formula:

$$H_2C=CHR^1—(CHR^2)_n—CH_2R^3$$

wherein at least two of $R^1$, $R^2$ and $R^3$ are $—OC(O)R^4$ and the remainder are hydrogen, $R^4$ is $C_{1-6}$ alkyl, preferably methyl, and n is 0, 1, 2, 3, 4 or 5. These copolymers are partially or completely hydrolyzed. "Hydrolyzed", as used in this context, relates to the fact that the ester groups are partially or completely saponified, so that the copolymer contains free hydroxyl groups at these points. "Partially hydrolyzed" means that some ester groups are saponified and others are not. In the copolymers described, the alkene diesters are preferably completely saponified to form diols. The vinyl ester monomers are also completely saponified to form vinyl alcohol units or the copolymer simultaneously contains vinyl alcohol and vinyl ester units. The degree of hydrolysis of the copolymer is 80 to 95 mol. % in various embodiments. The Höppler viscosity (DIN 53015, Höppler method, 4% aqueous solution) is preferably 1 to 30 mPas, preferably 2 to 25 mPas.

In various embodiments of the invention, the copolymers are such that they contain 50 to 95 wt. % monomer units based on the at least one vinyl ester monomer, preferably vinyl acetate, and 5 to 50 wt. % monomer units based on the at least one alkene diester monomer, preferably 3,4-diacetoxy-1-butene. Preferably, these copolymers do not contain any monomer units based on other monomers, i.e. the quantities of monomer units based on the at least one vinyl ester monomer and on monomer units based on the at least one alkene diester monomer preferably add up to 100 wt. %.

The copolymers may contain a type of vinyl ester monomer or several different types of vinyl ester monomers as monomer units. Similarly, either one alkene diester or a plurality of different alkene diesters may be used as comonomers. "Alkene diester", as used herein, relates to alkenes which have two esterified hydroxyl groups and again can be saponified to form diols.

The copolymer may be a copolymer of vinyl acetate having an alkene diester of the formula:

$$H_2C=CH_2—(CHR^2)_n—CH_2R^3$$

wherein at least two of $R^2$ and $R^3$ are $—OC(O)CH_3$ and the remainder are hydrogen, and n is 1, 2 or 3, preferably 1. In particular, the copolymer is a butene diol/vinyl alcohol copolymer (INCI: butene diol/vinyl alcohol copolymer; CAS: 917249-64-0).

In various embodiments, the stabilizer or the protective colloid comprises one or more of the various above-described copolymers or consists thereof. Preferably, the stabilizer is one of the above-described copolymers.

The stabilizer is contained in quantities of from 0.1 to 5.0 wt. %, preferably 0.4 to 2.5 wt. %, in each case based on the entirety of the adhesive composition. Irrespective of whether the adhesive contains one or more of the above-defined copolymers, the quantities stated relate to the total quantity of all the copolymers of the above formula contained in the adhesive composition.

The adhesive composition further contains a polymerizate dispersed in water and based on esters of acrylic or methacrylic acid, and optionally additional monomers that can be copolymerized therewith. "Based on esters of acrylic or methacrylic acid", as used herein, means that the polymerizate contains a greater quantity of esters of acrylic or methacrylic acid based on the total weight of the monomers and the total quantity of possible additional copolymerizable monomers. In various embodiments, the proportion of esters of the acrylic or methacrylic acid, based on the total weight of the monomers, is at least 50 wt. %.

Suitable monomers from the group of esters of acrylic acid or methacrylic acid are esters of unbranched or branched alcohols having 1 to 15 C atoms. Preferred methacrylic acid esters or acrylic acid esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate. Methyl acrylate, methyl methacrylate, n-butyl acrylate and 2-ethylhexyl acrylate are particularly preferable, and yet more preferable are methyl methacrylate and n-butyl acrylate. The polymerizate may contain one or more of the above-mentioned esters. Mixtures of methyl methacrylate and n-butyl acrylate are particularly preferable, in particular in a 1:1 weight ratio. Based on its total weight, in various embodiments the adhesive composition contains 15.0 to 40.0 wt. %, preferably 16.0 to 25.0 wt. %, (meth)acrylate monomer units in the form of the polymerizate.

Optionally, the methacrylic acid esters and acrylic acid esters may still be copolymerized with additional monomers, for example with one or more monomers from the group of vinyl esters of unbranched or branched carboxylic acids having 1 to 12 C atoms, vinyl aromatics, vinyl halides, olefins and dienes. If said monomers are copolymerized, then this is generally in a quantity of from 10 to 50 wt. % based on the total weight of the monomers.

Preferred vinyl esters are vinyl acetate, vinyl propionate, vinyl butyrate, vinyl-2-ethylhexanoate, vinyl laurate, 1-methyl vinyl acetate, vinyl pivalate and vinyl esters of α-branched monocarboxylic acids having 9 to 11 C atoms. Vinyl acetate is particularly preferred. Styrene, methyl styrene and vinyl toluene are preferred as vinyl aromatics. A preferred vinyl halide is vinyl chloride. The preferred olefins are ethylene, propylene and the preferred dienes are 1,3-butadiene and isoprene.

In preferred embodiments, auxiliary monomers may also be copolymerized. Examples of auxiliary monomers are ethylenically unsaturated monocarboxylic acids and dicarboxylic acids, preferably acrylic acid, methacrylic acid, fumaric acid and maleic acid; ethylenically unsaturated carboxylic acid amides and nitriles, preferably acrylamide and acrylonitrile; monoesters and diesters of fumaric acid and maleic acid such as diethyl and diisopropyl esters and maleic acid anhydride, ethylenically unsaturated sulfonic acids or the salts thereof, preferably vinylsulfonic acid and 2-acrylamido-2-methylpropane sulfonic acid. Other examples are pre-crosslinking comonomers such as multi-ethylenically unsaturated comonomers, for example divinyl adipate, diallyl maleate, allyl methacrylate or triallyl cyanurate, or post-crosslinking comonomers, for example acrylamido glycolic acid (AGA), methyl acrylamido glycolic acid methyl ester (MAGME), N-methylol acrylamide (NMA), N-methylol methacrylamide, N-methylol allylcarbamate, alkyl ethers such as isobutoxy ether or esters of N-methylol acrylamide, N-methylol methacrylamide and N-methylol allylcarbamate. Epoxy-functional comonomers such as glycidyl methacrylate and glycidyl acrylate are also suitable. Further examples are silicon-functional comonomers, such as acryloxypropyl tri(alkoxy)silanes and methacryloxypropyl tri(alkoxy)silanes, vinyl trialkoxysilanes and vinyl methyldialkoxysilanes, it being possible for ethyl glycol ether groups and ethyl propylene glycol ether groups to be present as alkoxy groups, for example. Monomers are also mentioned that have hydroxyl or CO groups, for example methacrylic acid- and acrylic acid hydroxyalkyl esters such as hydroxyethyl-, hydroxypropyl- or hydroxybutyl acrylate or -methacrylate and compounds such as diacetone acrylamide and acetyl acetoxy ethylacrylate or -methacrylate. Acrylic acid and methacrylic acid and mixtures thereof are particularly preferred, however. Such auxiliary polymers may be present in quantities of from 0.5 to 20.0 wt. %, preferably 1.0 to 15.0 wt. %, more preferably 2.0 to 12.0 wt. %, based on the total weight of the adhesive composition in the form of the polymerizate.

Homopolymerizates and copolymerizates are preferred, which contain one or more monomers from the group of methyl acrylate, methyl methacrylate, ethyl acrylate, ethyl methacrylate, propyl acrylate, propyl methacrylate, n-butyl acrylate, n-butyl methacrylate, 2-ethylhexyl acrylate, in particular homopolymerizates of n-butyl acrylate or 2-ethylhexyl acrylate or copolymerizates of methyl methacrylate with n-butyl acrylate and/or 2-ethylhexyl acrylate; and styrene acrylic acid ester copolymerizates with one or more monomers from the group of methyl acrylate, ethyl acrylate, propyl acrylate, n-butyl acrylate, 2-ethylhexyl acrylate; vinyl acetate acrylic acid ester copolymerizates with one or more monomers from the group of methyl acrylate, ethyl acrylate, propyl acrylate, n-butyl acrylate, 2-ethylhexyl acrylate and optionally ethylene; said homopolymerizates and copolymerizates may optionally also contain the above-mentioned auxiliary monomers.

Copolymerizates of methyl methacrylate with n-butyl acrylate are particularly preferred, which optionally also may contain the above-mentioned auxiliary monomers, in particular acrylic acid or methacrylic acid, particularly preferably methacrylic acid. Acrylates and methacrylates are present in such polymerizates in quantities of from 40.0 to 90.0 wt. %, preferably 60.0 to 80.0 wt. %, based on the total weight of the monomers in the polymerizate. The auxiliary monomers, i.e. in particular acrylic acid or methacrylic acid, are present in quantities of from 10.0 to 60.0 wt. %, preferably 20 to 40 wt. %, based on the total weight of the monomers in the polymerizate.

The monomer or the percentages by weight of the comonomers are selected such that, generally, a glass transition temperature Tg of from −50° C. to +50° C., preferably of from −30° C. to +40° C., results, provided that the polymer is incorporated into an adhesive composition which is intended to be used as a sealing adhesive. For use as a labeling adhesive, the monomer or the percentages by weight of the comonomers are preferably selected such that a glass transition temperature Tg of from +30° C. to +120° C. results. The glass transition temperature Tg of the polymerizates is determined in a known manner by means of differential scanning calorimetry (DSC).

In various embodiments, the adhesive composition contains, based on the total weight of the adhesive composition, 15.0 to 55.0 wt. %, preferably 15.0 to 40.0 wt. %, particularly preferably 16.0 to 25.0 wt. % of a copolymerizate, which in turn contains 40.0 to 89.0 wt. %, preferably 62.5 to 79.0 wt. % (meth)acrylate monomer units, in particular methyl methacrylate and n-butyl acrylate units, and 11.0 to 60.0 wt. %, preferably 21.0 to 37.5 wt. % (meth)acrylic acid monomer units, in particular methacrylic acid units. In one embodiment, the polymerizate contains methyl methacrylate, n-butyl acrylate and methacrylic acid monomer units in a mass ratio of 0.8-1.2:0.8-1.2:0.6-1.0, preferably 1:0.9-1.1: 0.7-0.9. In another embodiment, the polymerizate contains methyl methacrylate, n-butyl acrylate and acrylic acid monomer units in a mass ratio of 0.8-1.2:1.1-1.5:0.01-0.1, preferably 1:1.2-1.4:0.01-0.1.

The acrylate or methacrylate homopolymerizates or copolymerizates are produced in accordance with the emulsion polymerization method or in accordance with the suspension polymerization method, preferably in accordance with the emulsion polymerization method, the polymerization temperature generally being 40° C. to 100° C., preferably 60° C. to 90° C. The copolymerization of gaseous comonomers such as ethylene, 1,3-butadiene or vinyl chloride can also be carried out under pressure, generally of between 5 bar and 100 bar.

The polymerization is initiated using the water-soluble or monomer-soluble initiators or redox initiator combinations that are conventional for emulsion polymerization and suspension polymerization. Examples of water-soluble initiators are sodium salts, potassium salts and ammonium salts of peroxydisulfuric acid, hydrogen peroxide, t-butyl peroxide, t-butyl hydroperoxide, potassium peroxodiphosphate, tert-butyl peroxypivalate, cumene hydroperoxide, isopropyl benzene mono-hydroperoxide azobisisobutyronitrile. Examples of monomer-soluble initiators are dicetyl peroxydicarbonate, dicyclohexyl peroxydicarbonate, dibenzoyl peroxide. Said initiators are generally used in a quantity of from 0.001 to 0.7 wt. %, preferably 0.001 to 0.5 wt. %, in each case based on the total weight of the monomers.

Combinations of said initiators in combination with reducing agents are used as redox initiators. Suitable reducing agents are the sulfites and bisulfites of alkali metals and of ammonium, for example sodium sulfite, the derivatives of sulfoxyl acid such as zinc formaldehyde sulfoxylates or alkali formaldehyde sulfoxylates, for example sodium hydroxymethanesulfinate, and ascorbic acid. The quantity of reducing agent is generally 0.001 to 0.5 wt. %, in each case based on the total weight of the monomers.

To control the molecular weight, controlling substances may be used during polymerization. If controllers are used, they are usually used in quantities of between 0.01 to 5.0 wt. % based on the monomers to be polymerized, and are dispensed separately or such that they are pre-mixed with reaction components. Examples of such substances are n-dodecyl mercaptan, tert-dodecyl mercaptan, mercaptopropionic acid, mercaptopropionic acid methyl ester, isopropanol and acetaldehyde. Preferably, n-dodecyl mercaptan is used, for example in a quantity of from 1.0 wt. % to 2.0 wt. % based on the monomers to be polymerized.

During polymerization, the above-described polyvinyl-alcohol-based protective colloids are present in their entirety, or present in part and added in part, in the described quantities, preferably as an aqueous solution. Preferably, at least 5 wt. % of the protective colloid is present, more preferably the protective-colloid proportion is present in its entirety.

In certain embodiments, it may be advantageous to additionally use small quantities of emulsifiers, optionally 0.1 to 5 wt. % based on the monomer quantity. Suitable emulsifiers are anionic and cationic as well as non-ionic emulsifiers, for example anionic surfactants, such as alkyl sulfates having a chain length of from 8 to 18 C atoms, alkyl ether sulfates or alkyl aryl ether sulfates having 8 to 18 C atoms in the hydrophobic group and up to 40 ethylene-oxide or propylene-oxide units, alkyl sulfonates or alkyl aryl sulfonates having 8 to 18 C atoms, esters and semiesters of sulfosuccinic acid having monovalent alcohols or alkyl phenols, or non-ionic surfactants such as alkyl polyglycol ether or alkyl aryl polyglycol ether having 8 to 40 ethylene-oxide units. Owing to the presence of the above-described polyvinyl-alcohol-based protective colloids, it is however not necessary to use additional emulsifiers. In a preferred embodiment, therefore, no additional emulsifier is added.

The monomers, i.e. the (meth)acrylate monomers and the comonomers or auxiliary monomers that may be used, may be added in their entirety or are present in part and the remainder may be added after initiation of the polymerization. The monomers are preferably used in the form of an aqueous pre-emulsion, which may additionally contain controllers and emulsifiers (surfactants). Preferably, the process is such that the polyvinyl-alcohol-based protective colloids are present in their entirety in the described quantities, preferably as an aqueous solution, it being possible for the solution to be heated, for example to 70 to 80° C., at which point 1 to 10 wt. %, based on the total weight of the monomers, of the monomer pre-emulsion is added. After adding an initiator charge, the remainder of the monomers is generally added within 3-4 hours. The additions may be carried out separately (in space and time) or all or some of the components to be added may be added in pre-emulsified form, i.e. in the form of the above-described pre-emulsion.

The conversion of the monomers is controlled by adding the initiator. The initiators are added in their entirety and, in order to set the conversion rates in the first phase of polymerization, some of the initiator, for example 5 to 10 wt. %, is added as a starter charge and the remainder is then steadily added over a time period of 3-4 hours. Alternatively, the initiator may be added relatively slowly at the start of polymerization and then may be added at a significantly higher rate of addition in the end phase of polymerization.

After polymerization is complete, post-polymerization may be carried out using known methods in order to eliminate residual monomers, for example using post-polymerization initiated by a redox catalyst. Volatile residual monomers may also be eliminated by means of distillation, preferably at a reduced pressure, and optionally by passing inert carrier gases such as air, nitrogen or water vapor through or over the solution.

The aqueous dispersions and corresponding adhesive compositions that can be obtained using the methods described preferably have a solids content of from 30 to 75 wt. %. In various embodiments, said compositions contain 30 to 70 wt. %, preferably 40 to 70 wt. %, more preferably 50 to 70 wt. % water. They are preferably free of organic solvents.

In order to increase the number of different uses, further additives can be added to the dispersions. Further constituents (found in preferred embodiments) of adhesive dispersions are, for example, pigments, fillers, dyes, defoamers and preservatives.

The aqueous polymer dispersions may be dried using known methods in order to obtain protective-colloid-stabilized polymer powders that are redispersible in water.

The dispersions or powders may be used in their typical fields of application. Within the meaning of the present invention, they are preferably used as adhesives, more preferably as labeling adhesives or sealing adhesives. The use as an adhesive, in particular as a labeling adhesive or sealing adhesive, thus also forms part of the invention.

If the adhesive compositions are intended to be used as labeling adhesives, the viscosity of said compositions is preferably set such that it is from 10,000 to 250,000 mPas, preferably from 30,000 to 150,000 mPas (25° C., Brookfield, EN ISO 2555). If these compositions are intended to be used as sealing adhesives, the viscosity is preferably set such that it is from 50 to 6000 mPas, preferably from 100 to 2000 mPas (25° C., Brookfield, EN ISO 2555). In alternative uses, in particular those for plastics surfaces, the viscosity range is preferably 10,000 to 100,000 mPas.

The use of adhesive compositions according to invention is known. When the composition is used as a labeling adhesive, it is applied in particular to one side of a label, and this label is bonded to a receptacle, usually one having a moist or wet surface, immediately thereafter. Devices for such labeling methods are known to a person skilled in the art.

The adhesive dispersions of the invention are usually applied in quantities of from 5 to 80 g/m², preferably of from 5 to 50 g/m². The labels include known materials, in particular paper. The substrates to which adhesive is applied are receptacles used for packaging foods and beverages, such as bottles, cans and the like. The material of the receptacle may be glass, metal, plastics material, multi-layered packaging material or the like. Preferably, bottles and cans for beverages are used as receptacles. After the label is applied, the receptacles undergo further processing and are lastly dried.

The effect of the compositions according to the invention is the improved adhesive effect on wet or moist surfaces, and their suitability as sealing adhesives. Labels that are affixed using commercially available adhesives tend to slip out of position on moist surfaces, whereas when they are affixed using the above-described adhesives, the adhesive effect is improved and they are therefore prevented from slipping out of position.

The labels can be removed again by immersing the receptacle in water, preferably an alkaline solution. This is typically carried out at a high temperature of from 40 to 95° C., preferably of greater than 50° C. In the process, the solution or the receptacle is agitated so that the removal process is assisted by mechanical force. The adhesive is at least partially dissolved and is removed from the surface of the substrate.

EXAMPLES

Example 1

TABLE 1

Production of adhesive dispersion (labeling adhesive)

| REACTOR | Quantity (g) |
| --- | --- |
| Water | 383.25 |
| Butene diol/vinyl alcohol copolymer | 60.00 |
| PRE-EMULSION | |
| Water | 574.71 |
| Anionic surfactant (35%) | 20.00 |
| Lauryl mercaptan | 10.00 |
| n-Butyl acrylate | 280.00 |
| Methyl methacrylate | 280.00 |
| Methacrylic acid | 220.00 |
| INITIATOR CHARGE | |
| Water | 13.59 |
| Potassium peroxodisulfate | 0.27 |
| STARTER (continuous) | |
| Water | 144.95 |
| Potassium peroxodisulfate | 3.53 |
| Preservative | 4.80 |
| Defoamer | 0.36 |
| Water | 4.53 |

A solution was produced in the reactor from water and the polyvinyl-alcohol derivative. This was heated to 75° C. 5% of the pre-emulsion was added. After adding the initiator charge, the temperature increased. At 82° C., the remainder of the pre-emulsion was steadily added over a time period of 3.5 hours. At the same time, the starter was continuously steadily added over a time period of 3.75 hours. After cooling, preservatives and defoamers were added.

Example 2

TABLE 2

Production of adhesive dispersion (sealing adhesive)

| REACTOR | Quantity (g) |
| --- | --- |
| Water | 477.97 |
| Butene diol/vinyl alcohol copolymer | 8.00 |
| PRE-EMULSION | |
| Water | 400.00 |
| Anionic monomer | 8.00 |
| Lauryl mercaptan | 5.00 |
| n-Butyl acrylate | 520.00 |
| Methyl methacrylate | 400.00 |
| Acrylic acid | 25.00 |
| Butene diol/vinyl alcohol copolymer | 8.00 |
| INITIATOR CHARGE | |
| Water | 9.44 |
| Sodium peroxodisulfate | 0.99 |
| STARTER (continuous) | |
| Water | 130.00 |
| Sodium peroxodisulfate | 2.80 |
| Preservative | 4.80 |

A solution was produced in the reactor from water and the polyvinyl-alcohol derivative. This was heated to 75° C. 2% of the pre-emulsion was added. After adding the initiator charge, the temperature increased. At 77° C., the remainder of the pre-emulsion was steadily added over a time period of 2.5 hours. At the same time, the starter was continuously steadily added over a time period of 3 hours. After cooling, the preservative was added.

The invention claimed is:
1. An adhesive composition, characterized in that the adhesive composition is an aqueous (meth)acrylate dispersion comprising:
(a) 15.0 to 55.0 wt. %, based on the total weight of the adhesive composition, of a polymerizate based on (meth)acrylate monomers of:
(ia) methyl methacrylate,
(ib) n-butyl acrylate, and
(ic) methacrylic acid,
wherein said monomers (ia):(ib):(ic) are present in a weight ratio of 1:0.9-1.1:0.7-0.9;
(b) 0.1 to 5.0 wt. %, based on the total weight of the adhesive composition, of a stabilizer, which is a copolymer of vinyl acetate having an alkene diester of the formula:

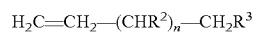

wherein at least two of $R^2$ and $R^3$ are $-OC(O)CH_3$ and the remainder are hydrogen, and n is 1, 2 or 3.

2. The adhesive composition according to claim 1, characterized in that the adhesive composition comprises:
(i) 30 to 70 wt. % water based on the total weight of the adhesive composition; and
(ii) optionally, auxiliary agents selected from the group consisting of antifoaming agents, preservatives, dyes and pigments.

3. The adhesive composition of claim 1, which is a labeling adhesive or sealing adhesive.

4. The adhesive composition according to claim 1, characterized in that the copolymer is a butene diol/vinyl alcohol copolymer having a degree of hydrolysis of from 80 to 95 mol %.

5. An adhesive composition, characterized in that the adhesive composition is an aqueous (meth)acrylate dispersion comprising:
(a) 15.0 to 55.0 wt. %, based on the total weight of the adhesive composition, of a polymerizate based on (meth)acrylate monomers and consisting of:
(ia) methyl methacrylate,
(ib) n-butyl acrylate, and
(ic) methacrylic acid,
wherein said monomers (ia):(ib):(ic) are present in a weight ratio of 1:0.9-1.1:0.7-0.9;
(b) 0.1 to 5.0 wt. %, based on the total weight of the adhesive composition, of a stabilizer, which is a copolymer of vinyl acetate having an alkene diester of the formula:

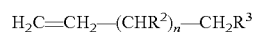

wherein at least two of $R^2$ and $R^3$ are $-OC(O)CH_3$ and the remainder are hydrogen, and n is 1, 2 or 3.

* * * * *